United States Patent
Choi et al.

(10) Patent No.: US 7,626,835 B2
(45) Date of Patent: Dec. 1, 2009

(54) PLASMA LIGHTING SYSTEM AND CONTROL METHOD THEREOF

(75) Inventors: Joon-Sik Choi, Seoul (KR); Yun-Chul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 154 days.

(21) Appl. No.: 11/392,742

(22) Filed: Mar. 30, 2006

(65) Prior Publication Data

US 2006/0255743 A1 Nov. 16, 2006

(30) Foreign Application Priority Data

May 11, 2005 (KR) ...................... 10-2005-0039487

(51) Int. Cl.
*H02J 3/00* (2006.01)
*H02M 5/40* (2006.01)

(52) U.S. Cl. ..................... 363/34; 315/111.41; 315/344

(58) Field of Classification Search .................. 363/34; 399/45
See application file for complete search history.

(56) References Cited

U.S. PATENT DOCUMENTS

| | | | | |
|---|---|---|---|---|
| 3,583,841 A | * | 6/1971 | Harvey | ................. 431/13 |
| 3,691,459 A | * | 9/1972 | Anderson | ................ 324/95 |
| 5,021,716 A | | 6/1991 | Lesea | ................ 315/219 |
| 5,142,151 A | * | 8/1992 | Varnell et al. | ........ 250/339.08 |
| 5,451,750 A | * | 9/1995 | An | ................ 219/716 |
| 5,896,287 A | * | 4/1999 | Mihara et al. | ........... 363/132 |
| 5,923,028 A | * | 7/1999 | Turnbull et al. | ....... 250/214 R |
| 6,040,661 A | * | 3/2000 | Bogdan | ................. 315/224 |
| 6,169,374 B1 | * | 1/2001 | Chang | ................. 315/224 |
| 6,946,795 B2 | | 9/2005 | Jeon et al. | |
| 2001/0026460 A1 | * | 10/2001 | Ito et al. | ................. 363/34 |
| 2001/0054881 A1 | | 12/2001 | Watanabe | ................. 320/166 |
| 2002/0167282 A1 | * | 11/2002 | Kirkpatrick et al. | ..... 315/248 |
| 2003/0164688 A1 | | 9/2003 | Park | ................. 315/276 |
| 2005/0035716 A1 | * | 2/2005 | Park | ................. 313/634 |
| 2005/0047176 A1 | | 3/2005 | Fukumoto | ................ 363/17 |
| 2005/0128750 A1 | | 6/2005 | Choi et al. | |

FOREIGN PATENT DOCUMENTS

| | | |
|---|---|---|
| EP | 1 507 283 A2 | 2/2005 |
| EP | 1 519 635 A1 | 3/2005 |
| FR | 2 707 054 A1 | 12/1994 |
| WO | WO 89/01234 A1 | 2/1989 |

OTHER PUBLICATIONS

European Search Report dated Jun. 3, 2009.

* cited by examiner

*Primary Examiner*—Edward Tso
*Assistant Examiner*—Arun Williams
(74) *Attorney, Agent, or Firm*—Ked & Associates, LLP

(57) ABSTRACT

A plasma lighting system comprising a storage unit for storing duty ratios of first and second switching signals according to each material within a bulb by an experiment, a controlling unit for detecting an optimal duty ratio from the storage unit and outputting the first and second switching signals with the same phase corresponding to the detected duty ratio, and a converting unit for converting a direct current voltage into an alternating current voltage consisting of a positive square wave and a negative square wave according to the first and second switching signals, and a method for controlling the same.

18 Claims, 5 Drawing Sheets

PLASMA LIGHTING SYSTEM AND CONTROL METHOD THEREOF

BACKGROUND OF THE INVENTION

1. Field of the Invention

The present invention relates to a Plasma Lighting System (PLS), and particularly, to a PLS which is capable of improving light-transmittance, and a control method thereof.

2. Background of the Invention

In general, a Plasma Lighting System (PLS) refers to a lighting device which can provide a great amount of light even without an electrode by changing inactive gases within a bulb into a plasma state using an electromagnetic wave generated from a high frequency oscillator (i.e., a magnetron) and thus by consecutively emitting light.

The PLS can be used for a long time without a light velocity degradation because of an emission of light based upon a principle for a plasma emission. The PLS can also protect a user's eyesight because of an implementation of a consecutive light spectrum which is the same as that of a natural white color, and provide a comfortable lighting environment by reducing an emission of ultraviolet or infrared rays.

FIG. 1 is a block diagram illustrating a construction of a related art PLS.

As illustrated in FIG. 1, a related art PLS includes a power source unit 1, a rectifying unit 2, a semi-bridge inverter 3, a controlling unit 4, a transforming unit 5, a high voltage generating unit 6, and a magnetron 7.

The power source unit 1 supplies an alternating current (AC) voltage to the PLS for an operation thereof.

The rectifying unit 2 rectifies and smoothes the AC voltage inputted through the power source unit 1 and outputs a direct current (DC) voltage accordingly.

The semi-bridge inverter 3 inverts the DC voltage outputted from the rectifying unit 2 into an AC voltage according to switching control signals and outputs the inverted AC voltage.

An explanation will be made later in detail for an inner construction of the semi-bridge inverter 3.

The controlling unit 4 outputs the switching control signals to alternately switch first and second transistors S1 and S2 of the semi-bridge inverter 3.

The transforming unit 5 transforms the AC voltage outputted from the semi-bridge inverter 3, namely, induces a voltage obtained by transforming the AC voltage based upon a certain winding ratio of a primary coil toward a secondary coil.

The high voltage generating unit 6 generates a high voltage by multiplying the voltage which has been induced to the secondary coil by the transforming unit 5. Here, an explanation will later be made for an inner construction of the high voltage generating unit 6.

The magnetron 7 generates microwaves by receiving the voltage generated by the high voltage generating unit 6 as a driving voltage.

FIG. 2 is a circuit diagram showing the related PLS, and FIG. 3 is a waveform view showing an operation of the related art PLS.

Referring to FIGS. 2 and 3, the controlling unit 4 applies switching control signals $S_1$ and $S_2$ for alternately switching a first transistor S1 and a second transistor S2 respectively to gates G2 and G3 of the first and second transistors S1 and S2. It is thus possible to increase and decrease a resonant voltage and a current according to an on/off period of the switching control signals $S_1$ and $S_2$.

Here, a voltage and a current flowing on a primary coil of the transforming unit 5 are denoted as '$V_1$' and '$i_1$', respectively. On the basis of the voltage $V_1$ and the current $i_1$ flowing on the primary coil, a voltage $V_d$ rectified by the rectifying unit 2 is applied to the first transistor S1, and a negative voltage $-V_d$ of the voltage $V_d$ rectified by the rectifying unit 2 is applied to the second transistor S2.

The current $i_1$ flowing on the primary coil of the transforming unit 5 can be noticed as shown in FIG. 3.

Next, the high voltage generating unit 6 multiplies the voltage induced to the secondary coil by the transforming unit 5 via a capacitor C, diodes D1 and D2 and a resistance R, and applies a high voltage obtained accordingly to the MGT 7.

The MGT 7 then receives the inputted high voltage as a driving voltage and thus generates microwaves.

The microwaves oscillated in the MGT 7 are applied to a bulb via a wave-guide and a resonator. As a result, gases within the bulb are changed into a plasma state due to an electron collision to thus generate light.

It is effective to increase a light-transmittance when operating the PLS using a pulse signal. However, the PLS using the resonant semi-bridge inverter can not be operated using the pulse signal, resulting in degradation of the light-transmittance.

SUMMARY OF THE INVENTION

Therefore, an object of the present invention is to provide a Plasma Lighting System (PLS) in which a high power is momentarily applied to a magnetron by driving a pulse to oscillate electromagnetic waves, and the oscillated electromagnetic wave is used to repeatedly activate a plasma state of a bulb, so as to enable an improvement of a light-transmittance, and a method for controlling the same.

To achieve these and other advantages and in accordance with the purpose of the present invention, as embodied and broadly described herein, there is provided a PLS comprising: a storage unit for storing duty ratios of first and second switching signals according to each material within a bulb by an experiment; a controlling unit for detecting an optimal duty ratio from the storage unit and outputting the first and second control signals having the same phase corresponding to the detected duty ratio; and a converting unit for converting a DC voltage into an AC voltage consisting of a positive square wave and a negative square wave according to the first and second switching signals.

According to another embodiment of the present invention, a PLS can comprise: a power source unit for generating AC power; a rectifying unit for rectifying the AC power generated from the power source unit and outputting a DC voltage based upon the rectifying result; a controlling unit for detecting an optimal duty ratio according to a material within a bulb and outputting conversion control signals corresponding to the detected duty ratio; a converting unit for converting the DC voltage outputted from the rectifying unit into an AC voltage using the conversion control signals; a transforming unit for transforming the AC voltage outputted from the converting unit according to a particular winding ratio; a high voltage generating unit for multiplying the voltage transformed by the transforming unit according to a particular ratio and outputting the multiplied high voltage; and a magnetron for generating microwaves using the high voltage outputted from the high voltage generating unit.

To achieve these and other advantages and in accordance with the purpose of the present invention, a method for controlling a PLS can comprise: detecting an optimal duty ratio according to a material within a bulb; generating conversion control signals corresponding to the detected duty ratio; rectifying AC power and generating a DC voltage based upon the rectifying result; converting the DC voltage into an AC voltage using the conversion control signals; transforming the converted AC voltage according to a particular winding ratio and multiplying the transformed voltage; and generating microwaves according to the multiplied voltage.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Hereinafter, with reference to the attached drawings, explanations will be given for embodiments related to a Plasma Lighting System (PLS) which is capable of improving a light-transmittance by controlling a conversion time for converting a DC voltage into an AC voltage according to a material within a bulb so as to drive a pulse to thus momentarily apply a high voltage to a magnetron when operating the PLS, and a method for controlling the same.

Figure 1:
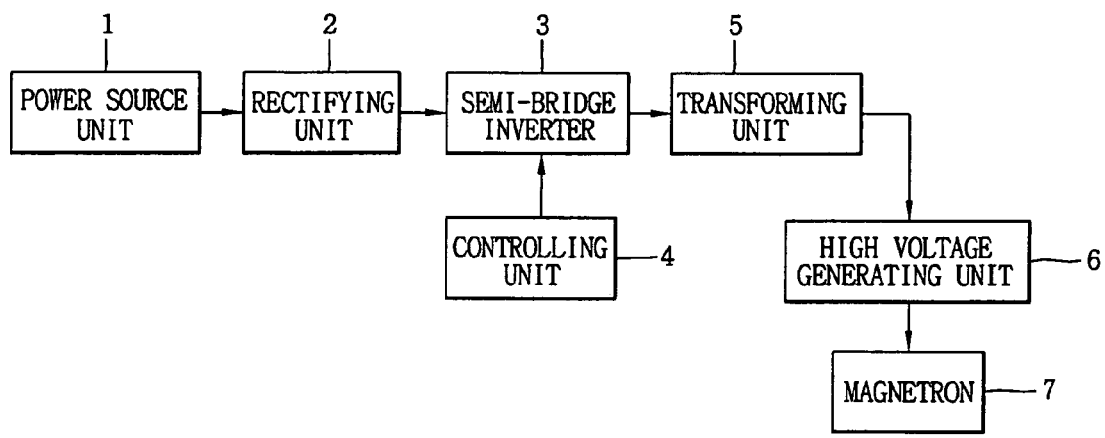
FIG. 1 is a block diagram illustrating a construction of a related art plasma lighting system.
Figure 2:
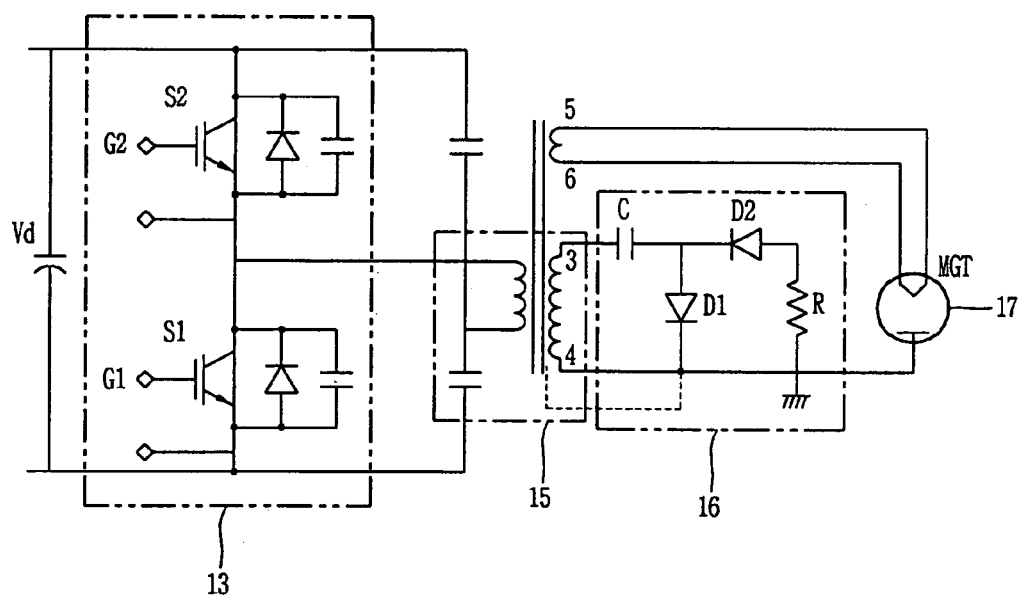
FIG. 2 is a circuit diagram illustrating the construction of the related art plasma lighting system.
Figure 3:
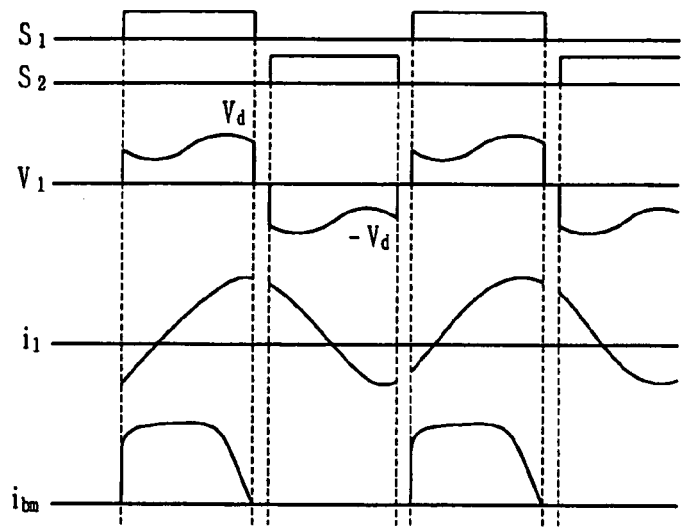
FIG. 3 is an operational waveform view illustrating the related art plasma lighting system.
Figure 4:
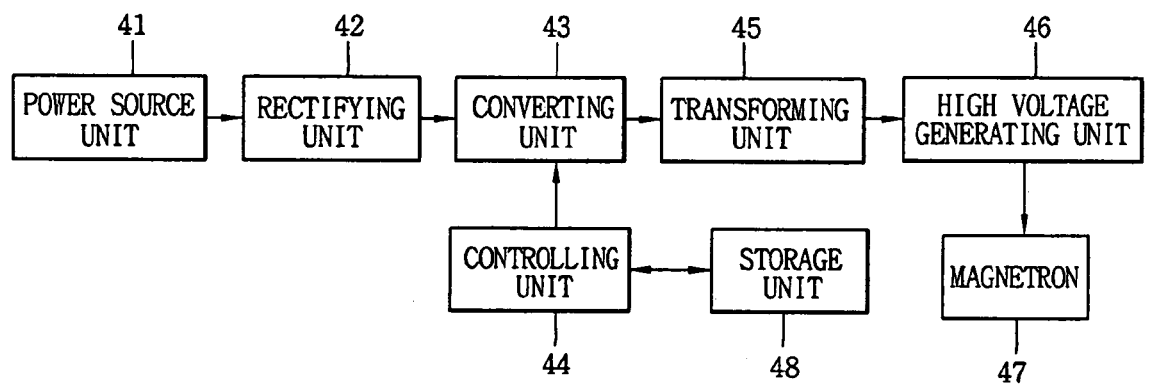
FIG. 4 is a block diagram illustrating a construction of a plasma lighting system according to the present invention.
Figure 5:
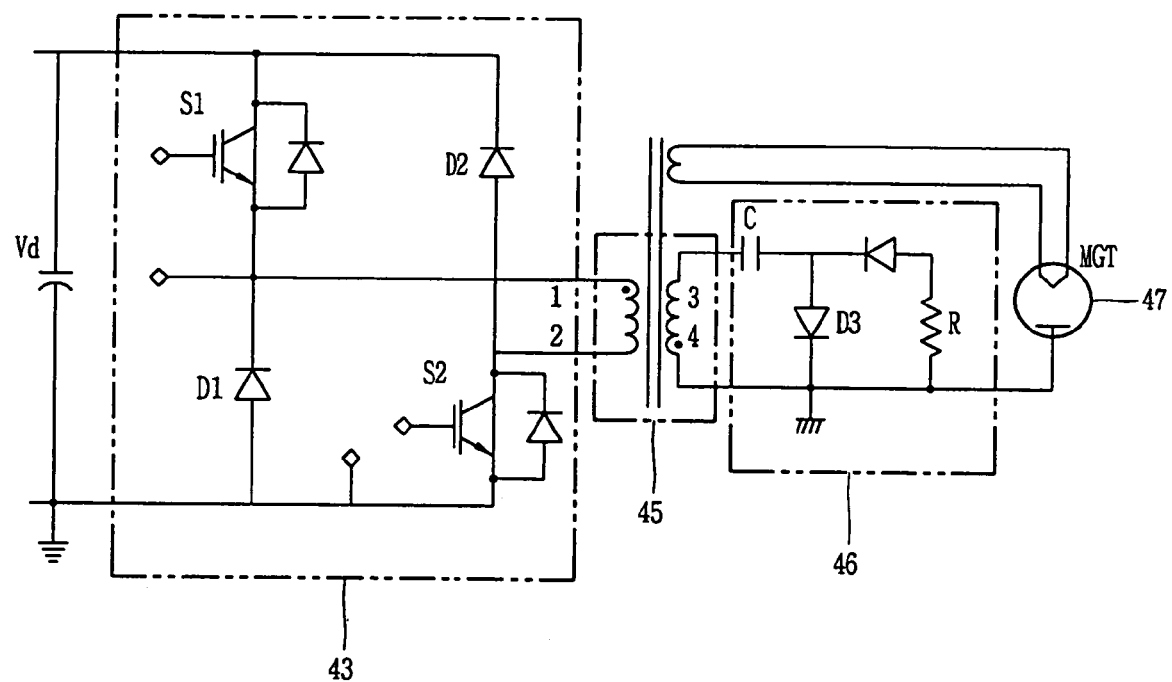
FIG. 5 is a circuit diagram illustrating the construction of the plasma lighting system according to the present invention.

FIG. 4 is a block diagram illustrating a construction of a PLS according to the present invention, and FIG. 5 is a circuit diagram illustrating the construction of the PLS according to the present invention.

As illustrated in FIGS. 4 and 5, a PLS according to the present invention can comprise a power source unit 41 for generating AC power, a rectifying unit 42 for rectifying the AC power generated from the power source unit 41 and outputting a DC voltage based upon the rectifying result, a controlling unit 44 for detecting an optimal duty ratio according to a material within a bulb and outputting conversion control signals corresponding to the detected duty ratio, a converting unit 43 for converting the DC voltage outputted from the rectifying unit 42 into an AC voltage according to the conversion control signals, a transforming unit 45 for transforming the AC voltage outputted from the converting unit 43 according to a particular winding ratio, a high voltage generating unit 46 for multiplying the voltage transformed by the transforming unit 45 according to a particular ratio and outputting the multiplied high voltage, a magnetron 47 for generating microwaves using the high voltage outputted from the high voltage generating unit 46, and a storage unit 48 for storing duty ratios of the conversion control signals according to each material within the bulb by an experiment.

The converting unit 43 is implemented as a semi-bridge inverter, which connects in parallel a first transistor S1 and a first diode D1 which are connected in series to each other and a second transistor S2 and a second diode D2 which are connected in series to each other.

Here, an emitter of the first transistor S1 is connected to a cathode of the first diode D1, and a first conversion signal which indicates a positive pulse voltage is outputted at the connection point therebetween.

A collector of the second transistor S2 is connected to an anode of the second diode D2, and a second conversion signal which indicates a negative pulse voltage is outputted at the connection point therebetween.

That is, the converting unit 43 converts the DC voltage into an AC voltage with a pulse waveform according to the conversion control signals.

The conversion control signals are implemented as first and second switching signals for respectively controlling an on/off state of the first and second transistors S1 and S2.

The first and second switching signals have pulse waves with the same phase. The first and second switching signals are set to have a duty ratio equal to or less than 40%.

The transforming unit 45 transforms the AC voltage outputted from the converting unit 43 based upon a winding ratio of a primary coil thereof, and induces the transformed voltage to a secondary coil thereof.

A method for controlling the PLS according to the present invention having such construction will now be explained with reference to FIG. 6.

Figure 6:
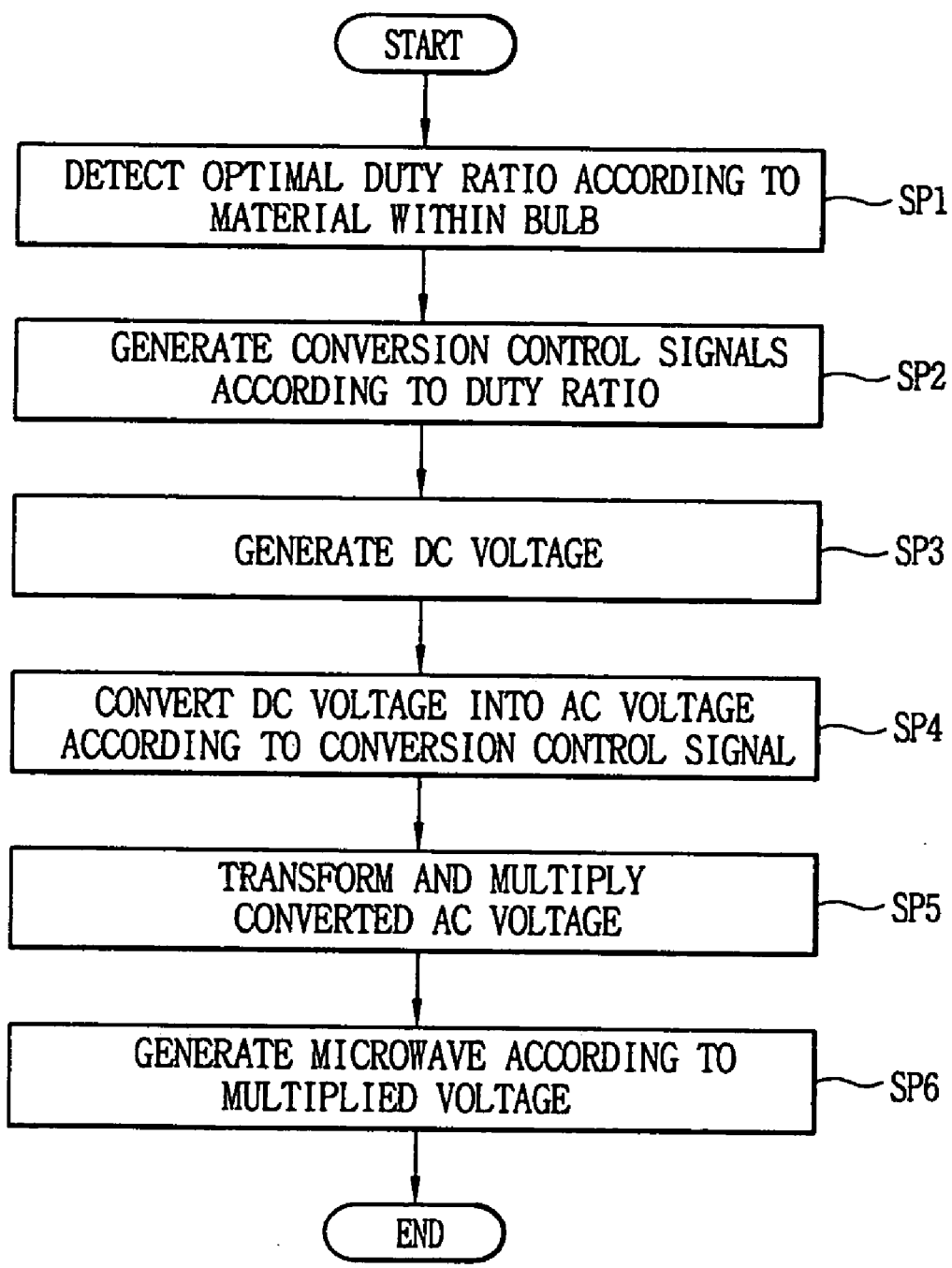
FIG. 6 is an operational flow chart illustrating a method for controlling a plasma lighting system according to the present invention.

FIG. 6 is an operational flow chart illustrating a method for controlling the PLS according to the present invention.

As illustrated in FIG. 6, a method for controlling the PLS according to the present invention can comprise detecting an optimal duty ratio according to a material within a bulb (SP1), generating conversion control signals corresponding to the detected duty ratio (SP2), rectifying AC power and generating a DC voltage based upon the rectifying result (SP3), converting the DC voltage into an AC voltage according to the conversion control signals (SP4), transforming the converted AC voltage according to a particular winding ratio and multiplying the transformed voltage (SP5), and generating microwaves according to the multiplied voltage.

The method for controlling the PLS according to the present invention will now be explained in more detail.

First, an optimal duty ratio according to a material within a bulb is set by an experiment and then stored in the storage unit 48.

In this way, the controlling unit 44 selects (detects) an optimal duty ratio with respect to a certain material within a bulb from the storage unit 48 (SP1), and generates conversion control signals corresponding to the selected duty ratio (SP2).

Here, the power source unit 41 supplies an AC voltage to operate the PLS. The rectifying unit 42 rectifies the AC voltage outputted from the power source unit 41 to a DC voltage and applies the rectified DC voltage to the converting unit 43 (SP3).

Accordingly, the converting unit 43 converts the DC voltage into the AC voltage according to the conversion control signals and then applies the converted AC voltage to the transforming unit 45 (SP4).

Here, the converting unit 43 is implemented as the semi-bridge inverter of which inner construction will be explained later in detail.

Next, the transforming unit 45 transforms the AC voltage outputted from the converting unit 43 based upon a winding ratio of its primary coil, and induces the transformed voltage toward its secondary coil to apply to the high voltage generating unit 46.

The high voltage generating unit 46 then multiplies the voltage induced to the secondary coil through the transforming unit 45, accordingly, to generate a high voltage (SP5).

Here, the MGT 47 then generates microwaves by receiving the high voltage generated from the high voltage generating unit 46 as a driving voltage (SP6). The microwaves oscillated in the MGT 47 are applied to the bulb via a wave-guide and a resonator. Accordingly, gases within the bulb are in a plasma state by an electron collision to thus generate light.

Figure 7:
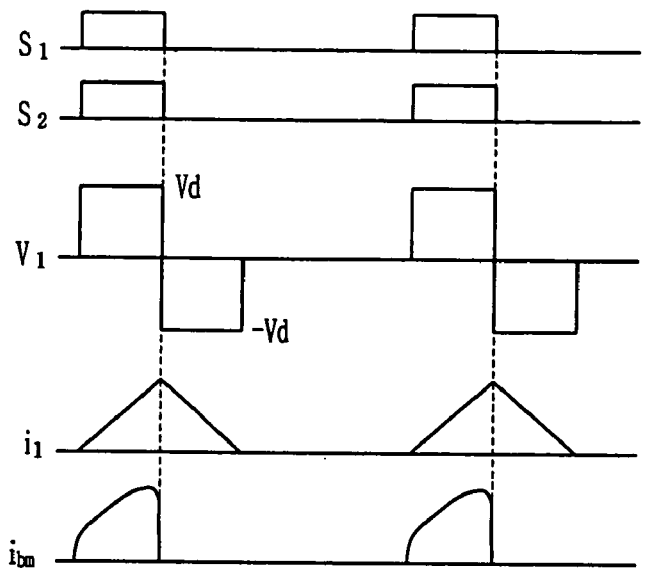
FIG. 7 is an operational waveform view illustrating the plasma lighting system according to the present invention.
Figure 8:
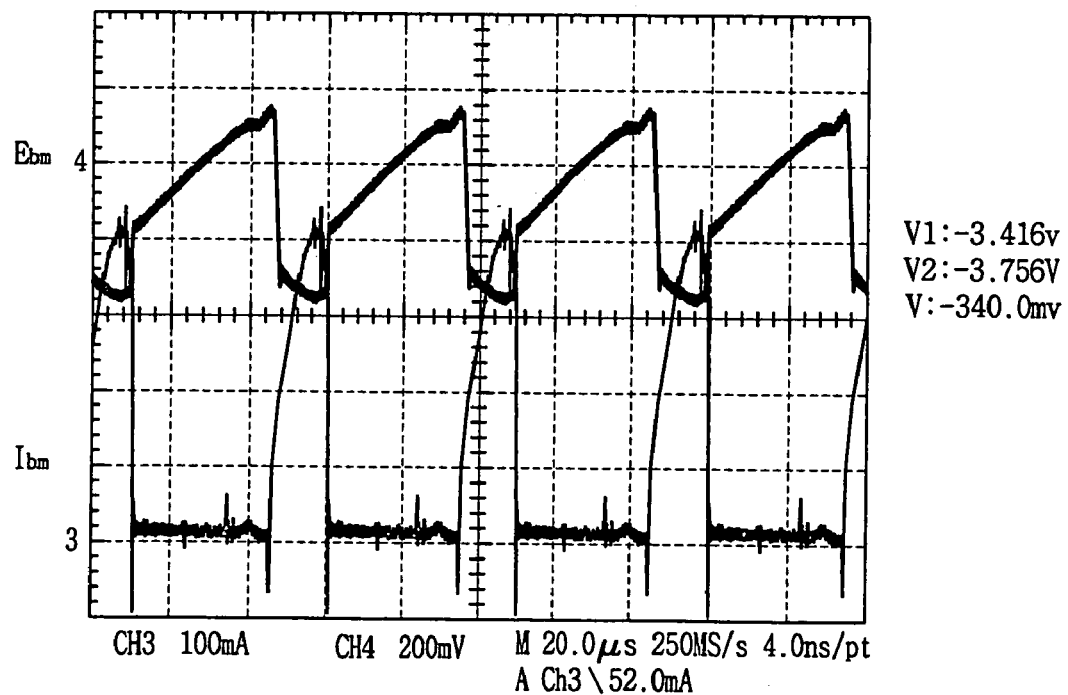
FIG. 8 is a waveform view illustrating an oscillating current and an oscillating voltage of a magnetron in the plasma lighting system according to the present invention.

Here, FIG. 7 is an operational waveform view of the PLS according to the present invention.

An operation of the converting unit which is one of main components of the present invention will now be explained in detail with reference to FIGS. 5 and 7.

First, the converting unit 43 is implemented as a semi-bridge inverter, and is constructed by connecting in parallel a first transistor S1 and a first diode which are connected in series to each other and a second transistor S2 and a second diode which are connected in series to each other.

Here, an emitter of the first transistor S1 is connected to a cathode of the first diode, and a first conversion signal is outputted at the connection point therebetween. The first conversion signal indicates a positive pulse voltage.

A collector of the second transistor S2 is connected to an anode of the second diode, and a second conversion signal is outputted at the connection point therebetween. The second conversion signal indicates a negative pulse voltage.

That is, the converting unit 43 converts the DC voltage into an AC voltage with a pulse waveform according to the conversion control signals.

Here, the conversion control signals, as illustrated in FIG. 7, are implemented as first and second switching signals for controlling an on/off state of each of the first transistor S1 and the second transistor S2.

The first and second switching signals consist of pulse waves having the same phase. The first and second switching signals are set to have a duty ratio equal to or less than 40% according to the present invention.

That is, the controlling unit 44 simultaneously turns on the first and second transistors S1 and S2 of the converting unit 43 according to the first and second switching signals. Upon simultaneously turning on the first and second transistors S1 and S2, the converting unit 43 converts the DC voltage outputted from the rectifying unit 42, and applies the AC voltage (i.e., $V_d$ and $-V_d$) to the primary coil of the transforming unit 45 as illustrated in FIG. 7.

The AC voltage ($V_d$ and $-V_d$) applied to the primary coil of the transforming unit 45 is then transformed according to a particular winding ratio to be induced toward the secondary coil of the transforming unit 45. The high voltage generating unit 46 multiplies the voltage induced to the transforming unit 45 to output a high voltage.

Here, a waveform of the current $i_1$ applied to the primary coil of the transforming unit 45 can be seen in FIG. 7.

Upon turning on the first and second transistors S1 and S2 of the converting unit 43, an energy accumulated in the transforming unit 45 is freely wheeled toward the power source via the diodes D1 and D2. A diode D3 is conducted to the secondary coil of the transforming unit 45. Accordingly, a voltage is charged in a condenser C until the energy of the transforming unit 45 is completely consumed.

Here, if the energy of the transforming unit 45 is not completely consumed, when the first and second transistors S1 and S2 of the converting unit 43 are turned on, the transforming unit 45 may be problematically damaged due to the energy accumulation. The controlling unit 44 regards such problems accordingly to set duty ratios of each switching signal for turning on/off the first and second transistors S1 and S2.

Afterwards, in order to oscillate the MGT 47, a current of about 10 A is applied to a cathode heater (not shown) located at the secondary coil of the transforming unit 45.

Then, the MGT 47 can have characteristics of waveforms of oscillating current $i_{bm}$ and oscillating voltage $E_{bm}$. Therefore, a pulse can be driven by controlling the turn-on timing of each of the first and second transistors S1 and S2 in the converting unit 43.

As aforementioned, in the PLS and the method for controlling the same according to the present invention, when operating the PLS, a light-transmittance can be improved by controlling the conversion time for converting the DC voltage into the AC voltage according to the materials within the bulb so as to drive a pulse to thus momentarily apply a high voltage to the magnetron.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A plasma lighting system, comprising:
   a storage for storing duty ratios of first and second switching signals according to each material within a bulb;
   a controller for detecting an optimal duty ratio according to each material within the bulb from the storage and outputting the first and second switching signals with the same phase corresponding to the detected optimal duty ratio; and
   a converter including a semi-bridge inverter for converting a direct current (DC) voltage into an alternating current (AC) voltage consisting of a positive square wave and a negative square wave using the first and second switching signals having pulse waves with a same phase, respectively, corresponding to the detected optimal duty ratio according to each material within the bulb,
   wherein the plasma lighting system repeatedly activates a plasma state of the bulb by controlling a conversion time for converting the DC voltage into the AC voltage according to a material within the bulb.

2. The system of claim 1,
   wherein the first and second switching signals are set to have a duty ratio equal to or less than 40%.

3. A plasma lighting system, comprising:
   a power source for generating AC power;
   a rectifier for rectifying the AC power generated from the power source and outputting a DC voltage based upon the rectifying result;
   a controller for detecting an optimal duty ratio according to a material within a bulb and outputting conversion control signals corresponding to the detected optimal duty ratio;

a converter including a semi-bridge inverter for converting the DC voltage outputted from the rectifier into an AC voltage using the conversion control signals corresponding to the detected optimal duty ratio according to each material within the bulb, wherein the conversion control signals are implemented as first and second switching signals having pulse waves with a same phase;

a transformer for transforming the AC voltage outputted from the converter according to a particular winding ratio;

a high voltage generator for multiplying the voltage transformed by the transformer according to the particular winding ratio and outputting the multiplied high voltage; and a magnetron for generating microwaves using the multiplied high voltage outputted from the high voltage generator, wherein the plasma lighting system applies a high power momentarily to the magnetron, to repeatedly activate a plasma state of the bulb by controlling a conversion time for converting the DC voltage into the AC voltage according to a material within the bulb.

4. The system of claim 3, further comprising:
a storage for storing duty ratios of the conversion control signals according to each material within the bulb.

5. The system of claim 3,
wherein the converter connects in parallel a first transistor and a first diode which are connected in series to each other and a second diode and a second transistor which are connected in series to each other.

6. The system of claim 5,
wherein the converter outputs a first conversion signal at the connection point at which an emitter of the first transistor is connected to a cathode of the first diode.

7. The system of claim 6,
wherein the first conversion signal is a positive pulse voltage.

8. The system of claim 5,
wherein the converter outputs a second conversion signal at a connection point at which a collector of the second transistor is connected to an anode of the second diode.

9. The system of claim 8,
wherein the second conversion signal is a negative pulse voltage.

10. The system of claim 5,
wherein first and second switching signals control an on/off state of each of the first and second transistors.

11. The system of claim 3,
wherein the converter converts the direct current voltage into an alternating current voltage with a pulse waveform according to the conversion control signals.

12. The system of claim 3,
wherein the first and second switching signals are set to have a duty ratio equal to or less than 40%.

13. The system of claim 3,
wherein the transformer transforms the AC voltage based upon a winding ratio of a primary coil thereof, and induces the transformed voltage toward a secondary coil thereof.

14. A method for controlling a plasma lighting system, comprising:
detecting an optimal duty ratio according to a material within a bulb;

generating conversion control signals corresponding to the detected optimal duty ratio according to the material within the bulb;

rectifying alternating current power and generating a direct current voltage based upon a rectifying result;

converting the direct current voltage into an alternating current voltage using the conversion control signals corresponding to the detected optimal duty ratio according to each material within the bulb, wherein the conversion control signals are implemented as first and second switching signals having pulse waves with a same phase;

transforming the converted alternating current voltage according to a particular winding ratio and multiplying the transformed voltage;

generating microwaves according to the multiplied voltage, and repeatedly activating a plasma state of the bulb using the microwaves.

15. The method of claim 14, further comprising:
setting an optimal duty ratio according to each material within the bulb and storing the set optimal duty ratio.

16. The method of claim 15,
wherein the optimal duty ratio according to each material within the bulb is set to be equal to or less than 40% to be stored.

17. The method of claim 14,
wherein the conversion includes converting the direct current voltage into an alternating current voltage with a pulse waveform according to the conversion control signals.

18. The method of claim 17,
wherein the conversion further includes consecutively generating a positive pulse voltage and a negative pulse voltage respectively in synchronization with the first and second switching signals.

* * * * *